US012628728B2

(12) United States Patent
Schoeny et al.

(10) Patent No.: US 12,628,728 B2
(45) Date of Patent: May 19, 2026

(54) SYSTEM AND METHOD FOR ROW UNIT DISK OFFSET CALIBRATION

(71) Applicant: CNH Industrial America LLC, New Holland, PA (US)

(72) Inventors: Christopher Schoeny, Minooka, IL (US); Trevor Philip Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 730 days.

(21) Appl. No.: 18/084,744

(22) Filed: Dec. 20, 2022

(65) Prior Publication Data

US 2024/0196786 A1     Jun. 20, 2024

(51) Int. Cl.
    *A01C 7/20*         (2006.01)
    *A01B 5/04*         (2006.01)

(52) U.S. Cl.
    CPC .............. *A01C 7/203* (2013.01); *A01B 5/04* (2013.01)

(58) Field of Classification Search
    CPC .................................. A01C 7/203; A01B 5/04
    USPC .......................................................... 701/50
    See application file for complete search history.

(56) References Cited

U.S. PATENT DOCUMENTS

|  |  |  |
|---|---|---|
| 9,408,337 B2 | 8/2016 | Sauder et al. |
| 10,251,333 B2 | 4/2019 | Bassett |
| 10,555,454 B2 | 2/2020 | Garner et al. |
| 11,122,731 B2 | 9/2021 | Hubner et al. |

| 2019/0110388 A1* | 4/2019 | Gresch ...................... A01C 7/20 |
|---|---|---|
| 2019/0380259 A1 | 12/2019 | Frank et al. |
| 2020/0068778 A1* | 3/2020 | Schoeny ................ A01C 7/203 |
| 2020/0340215 A1* | 10/2020 | Harnetiaux .............. A01C 7/16 |
| 2020/0390024 A1 | 12/2020 | Naylor et al. |
| 2021/0059095 A1* | 3/2021 | Sloneker ................ A01C 5/064 |
| 2021/0127549 A1 | 5/2021 | Kinney et al. |
| 2024/0057517 A1* | 2/2024 | Martin ................... A01C 7/203 |

FOREIGN PATENT DOCUMENTS

| BR | 102023025066 A2 * | 7/2024 | |
|---|---|---|---|
| EP | 2510768 A1 * | 10/2012 | ............. A01C 5/066 |

OTHER PUBLICATIONS

Rosu, Bogdan, Gheorghe Voicu, Gabriel-Alexandru Constantin, Paula Tudor, and Elena-Madalina Stefan. 2024. "Aspects Regarding the Physical Parameters and Wear in the Work Process of the Disc Openers for Seeding Machines" Agriculture 14, No. 7: 1066. https://doi.org/10.3390/agriculture14071066 (Year: 2024).*

* cited by examiner

*Primary Examiner* — Matthias S Weisfeld
*Assistant Examiner* — Hyang Ahn
(74) *Attorney, Agent, or Firm* — Fletcher Yoder, P.C.

(57)                ABSTRACT

A system comprising an actuator configured to couple to a closing link and to a frame of an agricultural row unit, a monitoring system comprising a sensor, and a controller comprising a memory and a processor. The closing link is configured to pivotally couple to the frame and the actuator is configured to drive the closing link to rotate relative to the frame to control a closing depth of a closing disc rotatably coupled to the closing link. The sensor is configured to output a sensor signal indicative of an extension length of the actuator. The controller is communicatively coupled to the sensor, and the controller is configured to determine the extension length of the actuator based on the sensor signal.

20 Claims, 4 Drawing Sheets

100

100

102 — DETERMINE LENGTH OF ACTUATOR

104 — DETERMINE MIN AND MAX TRAVEL CALIBRATIONS PERFORMED ?

NO → INSTRUCT OPERATOR TO PERFORM MIN /MAX CALIBRATIONS — 106

YES

108 — DETERMINE OFFSET RATIO

110 — DETERMINE CALCULATED OFFSET RATIO MATCHES EXPECTED OFFSET RATIO ?

NO → OUTPUT NOTIFICATION — 112

YES

114 — INITIATE OPERATION

SYSTEM AND METHOD FOR ROW UNIT DISK OFFSET CALIBRATION

BACKGROUND

The present disclosure relates generally to a system and a method for row unit disk offset calibration.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, seeding implements are towed behind a tractor or other work vehicle. The seeding implement typically includes a ground engaging tool, such as an opener disc, that forms a seeding path for seed deposition into the soil. In certain configurations, a gauge wheel is positioned a vertical distance above the opener disc to establish a desired trench depth for seed deposition into the soil. The seeding implement may also include a closing disc positioned at a horizontal distance behind the opener wheel and configured to close the trench after seed deposition. During seeding operations, the closing disc may wear, thereby reducing the effectiveness of the closing disc. Unfortunately, detection of closing disc wear by direct measurement may be significantly time-consuming, thereby reducing the efficiency of seeding operations.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a system may include an actuator configured to couple to a closing link and to a frame of an agricultural row unit, a monitoring system comprising a sensor configured to output a sensor signal indicative of an extension length of the actuator, and a controller comprising a memory and a processor. The closing link is configured to pivotally couple to the frame and the actuator is configured to drive the closing link to rotate relative to the frame to control a closing depth of a closing disc rotatably coupled to the closing link. The controller is communicatively coupled to the sensor, and the controller is configured to determine the extension length of the actuator based on the sensor signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
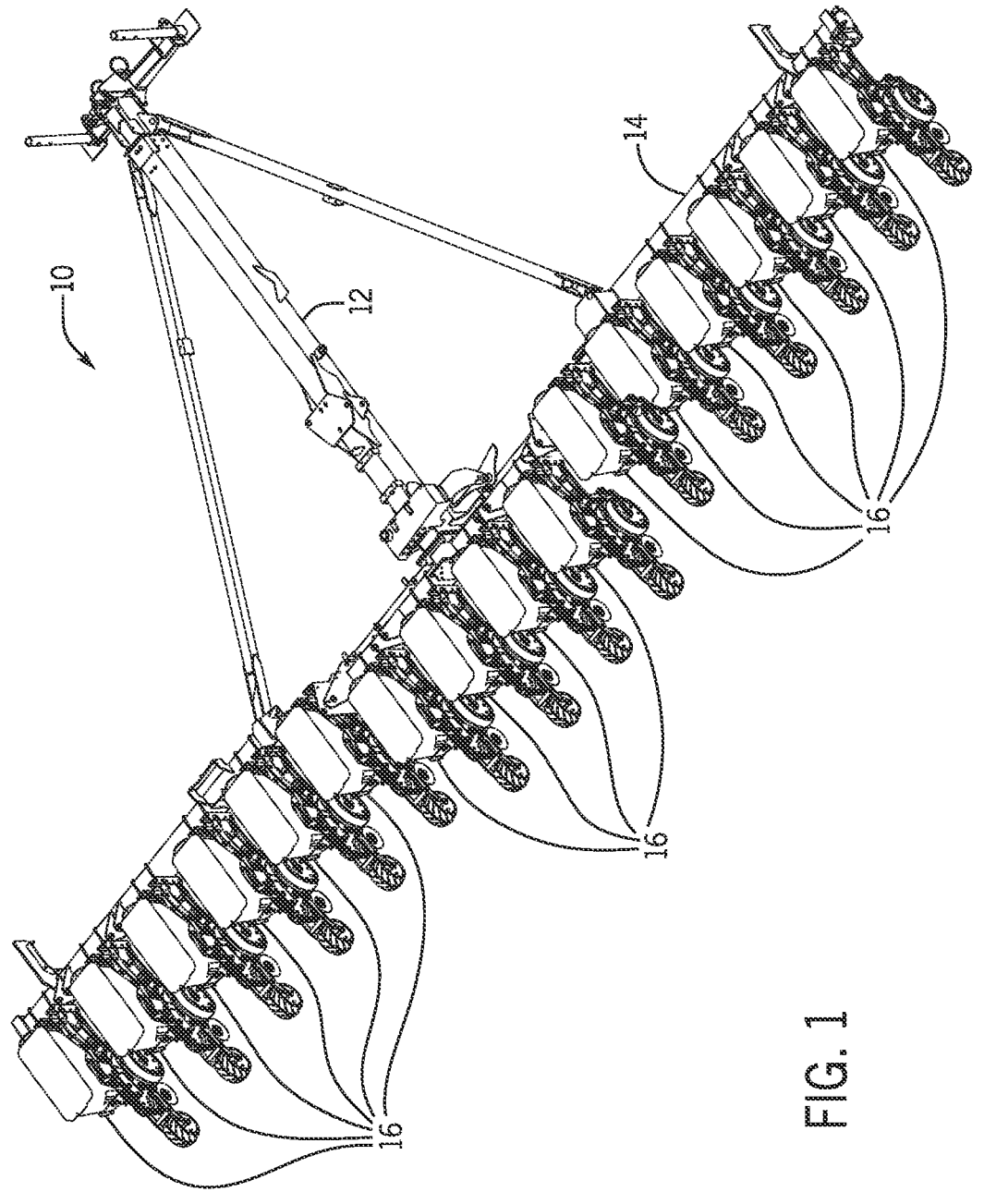
FIG. 1 is a perspective view of an embodiment of an agricultural implement.

FIG. 1 is a perspective view of an embodiment of an agricultural implement 10. The agricultural implement 10 is designed to be towed behind a work vehicle, such as a tractor. The agricultural implement 10 includes a tongue assembly 12 which is shown in the form of an A-frame hitch assembly. The tongue assembly 12 may include a hitch used to attach to an appropriate tractor hitch via a ball, clevis, or other suitable coupling. For example, a tongue of the agricultural implement 10 may be connected to a drawbar of the work vehicle, or a mast of the agricultural implement 10 may be connected to a three-point hitch of the work vehicle. The tongue assembly 12 is coupled to a tool bar 14, which supports multiple seeding implements or row units 16. For example, in certain embodiments, each row unit 16 includes an opener assembly having an opener disc rotatably coupled to a frame (e.g., chassis) of the row unit and configured to engage soil to form a trench within the soil. The opener assembly also includes a gauge wheel configured to rotate across a soil surface to control a penetration depth of the opener disc into the soil. In addition, the opener assembly includes an opener depth control cylinder extending between the frame and the gauge wheel. The opener depth control cylinder is configured to control the penetration depth of the opener disc by varying position of the gauge wheel relative to the frame. In certain embodiments, the agricultural implement 10 includes a depth control system configured to automatically control the penetration depth of the opener discs of the row units 16.

Each row unit 16 also includes a closing disc coupled to the row unit frame at a horizontal distance behind the opener disc. The closing disc is rotatably coupled to the row unit frame and configured to direct displaced soil into the trench. A closing depth of the closing disc may be similar to the penetration depth of the opener disc. The closing depth is controlled by a closing depth control actuator (e.g., cylinder) configured to position the closing disc at the closing depth below the soil surface. In certain embodiments, the depth adjustment system is also configured to control the closing depths of the closing discs of the row units 16.

The row unit 16 includes a monitoring system to determine a zero offset point between the opener disc and the closing disc to monitor an amount of wear on the opener discs, the closing discs, or both. To this end, a calibration procedure may be performed to determine an optimal extension of the closing disc actuator and achieve a proper depth of the closing discs relative to the penetration depth. The monitoring system may also determine an offset ratio based on a calibration length of the closing disc actuator, a length of the actuator while the closing discs are at an upper vertical limit, and the length of the actuator while the closing discs are at the lower vertical limit. The monitoring system may compare the offset ratio to a target offset ratio to monitor the wear on the opener discs, the closing discs, or both. In certain instances, the monitoring system may control the closing disc actuator to substantially achieve a target closing depth for the closing discs, thereby improving seeding operations.

Figure 2:
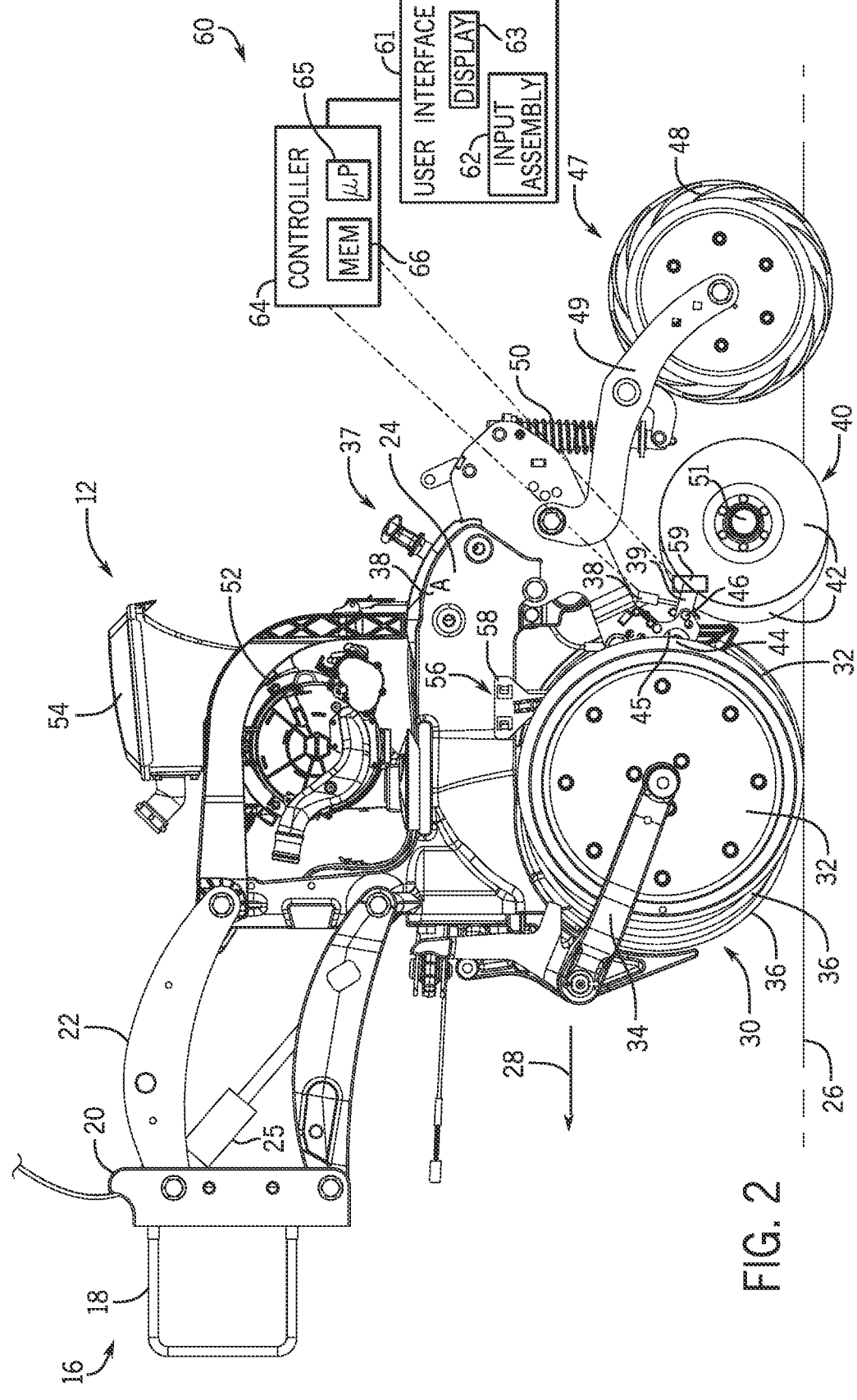
FIG. 2 is a side view of an embodiment of a row unit that may be employed within the agricultural implement of FIG. 1.

FIG. 2 is a side view of an embodiment of a row unit 16 (e.g., agricultural row unit) that may be employed within the agricultural implement of FIG. 1. The row unit 16 includes a mount 18 configured to secure the row unit 16 to the tool bar of the agricultural implement. In the illustrated embodiment, the mount 18 includes a U-bolt that secures a bracket 20 of the row unit 16 to the tool bar. However, in alternative embodiments, the mount may include another suitable device that couples the row unit to the tool bar. A row unit linkage assembly 22 extends from the bracket 20 to a frame 24 of the row unit 16. The row unit linkage assembly 22 is configured to enable vertical movement of the frame 24 relative to the tool bar in response to variations in a soil surface 26. In certain embodiments, a down pressure system 25 (e.g., including a hydraulic actuator, a pneumatic actuator, etc.) may be coupled to the row unit linkage assembly 22 and configured to urge the frame 24 toward the soil surface 26. While the illustrated row unit linkage assembly 22 is a parallel linkage assembly (e.g., a four-bar linkage assembly), in other embodiments, another suitable linkage assembly may extend between the bracket and the frame.

The row unit 16 is configured to deposit seeds and/or other agricultural product(s) at a desired depth beneath the soil surface 26 as the row unit 16 traverses a field along a direction of travel 28. The row unit 16 includes an opener assembly 30 that forms a trench in the soil for seed/other agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are rotatably coupled to the frame 24 and configured to excavate a trench into the soil, and the gauge wheels 32 are configured to control the penetration depth of the opener discs 36 into the soil. In the illustrated embodiment, the row unit 16 includes a depth control system 35 configured to control the vertical position of the gauge wheels 32 (e.g., by blocking rotation of the arms 34 in the upward direction beyond a selected orientation), thereby controlling the penetration depth of the opener discs 36 into the soil. The depth control system 35 includes an actuator 37 configured to control the penetration depth of opener discs 36 and an actuator 38 configured to control the penetration depth of closing discs 42. The row unit 16 also includes an agricultural product conveying system (e.g., seed tube or powered agricultural product conveyor) configured to deposit seeds and/or other agricultural product(s) (e.g., fertilizer) into the trench.

The opener assembly 30 and the agricultural product conveying system are followed by a closing assembly 40 that moves displaced soil back into the trench. The opener assembly 30 and the agricultural product conveying system are followed by a closing assembly 40 that moves displaced soil back into the trench. In the illustrated embodiment, the closing assembly 40 includes two closing discs 42, an actuator 38, and a closing link 39 that pivotally couple the closing discs 42 to the frame 24 of the row unit 16. The closing discs 42 engage the soil and are driven to rotate as the row unit 16 moves along the direction of travel 28. While the closing assembly 40 includes two closing discs 41 in the illustrated embodiment, in other embodiments, the closing assembly may include more or fewer closing discs (e.g., 1, 3, 4, or more). The actuator 38 (e.g., hydraulic actuator, pneumatic actuator, etc.) is coupled to the row unit frame 24 and the closing link 39. In addition, the actuator 38 is configured to control the vertical position of the closing discs 42, thereby controlling the closing depth of the closing discs 42 beneath the soil surface 26.

The closing link 39 positions the closing discs 42 a horizontal distance behind the opener assembly 30. The row unit 16 includes a linkage pin 44 configured to pivotally couple the closing link 39 to the frame 24. Each closing link 39 includes segments 45 and a clevis pin 46. The clevis pin 46 pivotally couples the actuator 38 to the closing link 39. The clevis pin 46 may be a non-threaded fastener disposed within one or more holes in the closing link 39 to couple the actuator 38 to the closing link 39. The clevis pin 46 is coupled to a closing disc bearing 51 of the closing disc 42 via the segment 45. In this way, the clevis pin 46 may pivotally couple the closing disc 42 to the linkage pin 44.

In certain embodiments, the clevis pin 46 may engage one or more stops to block upward and/or downward movement of the closing link 39, thereby establishing an upper vertical limit and a lower vertical limit for the closing discs 42. For example, the upper stop may be a pin at a vertical distance above the clevis pin 46 relative to the frame 24, and the lower stop may be a pin at a vertical distance below the clevis pin 46 relative to the frame 24. In an embodiment, the one or more stops may be a pin at a vertical distance above and/or below the closing link 39 relative to the frame 24. In this way, vertical movement of the closing discs 42 may be limited.

In the illustrated embodiment, the closing discs 42 are smaller than the opener discs 36. For the closing discs 42 and the opener discs 36 to contact a common plane (e.g., at the soil surface 26), the actuator 38 may extend to a calibration length. While the actuator 38 is at the calibration length, the rotation axis of the closing discs 42 are at a vertical offset relative to the rotation axis of the opener discs 36. For example, the vertical offset may be equal to a vertical distance between the rotation axes of the closing discs and the opener discs for a bottom of the closing discs 42 to be level with a bottom of the opener discs 36. The vertical offset while the closing discs 42 and the opener discs 36 are in contact with the common plane may be known as a zero offset point, which corresponds to the actuator 38 being at the calibration length.

In the illustrated embodiment, the closing assembly 40 is followed by a packing assembly 47 configured to pack soil on top of the deposited seeds and/or other agricultural product(s). The packing assembly 47 includes a packer wheel 48, an arm 49 that pivotally couples the packer wheel 48 to the frame 24, and a biasing member 50 configured to urge the packer wheel 48 toward the soil surface 26, thereby enabling the packer wheel to pack soil on top of the deposited seeds and/or other agricultural product(s). While the illustrated biasing member 50 includes a spring, in other embodiments, the biasing member may include another suitable biasing device, such as a hydraulic cylinder or a pneumatic cylinder, among others. Furthermore, in certain embodiments, the packing assembly may be omitted.

The row unit 16 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in other embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 16 includes a scraper assembly 56 having an outer scraper 58 (e.g., first outer scraper) coupled to the frame 24 and configured to engage an outer surface of an opener disc 36 (e.g., first disc). Furthermore, in certain embodiments, the scraper assembly 56 includes an inner scraper (e.g., first inner scraper) configured to engage an inner surface of the opener disc 36. Furthermore, in certain embodiments, the scraper assembly may include a second inner scraper and a second outer scraper configured to remove accumulated soil from a second opener disc of the row unit. In certain embodiments, any or all of the scrapers disclosed above may be omitted. For example, the scraper assembly may be omitted.

In certain embodiments, the agricultural implement 10 includes a monitoring system 60 configured to determine a zero offset point, thereby monitoring an amount of wear on the opener discs 36 and/or the closing discs 42. For example, the monitoring system 60 may determine excessive wear by determining the extension length of the actuator 38 while the closing discs 42 are at the upper vertical limit and the extension length of the actuator 38 while the closing discs 42 are at the lower vertical limit. The monitoring system 60 includes one or more sensors 59 configured to output sensor signal(s) indicative of the extension length of the actuator 38 as the closing link 39 moves through a range of motion (e.g., defined by the upper and lower vertical limits of the closing discs 42). Each sensor (e.g., actuator position sensor) 59 may include a linear variable differential transformer (LVDT), a potentiometer, an infrared sensor, an ultrasonic sensor, a proximity sensor, a pressure sensor, or another suitable type of sensor. Each actuator position sensor 59 is configured to output a sensor signal indicative of the extension length of the actuator 38 and/or a position of the clevis pin 46 relative to the row unit frame 24. For example, the sensor signal may be indicative of a position of the closing disc bearing 51 relative to the frame 24. In another example, the sensor signal may be indicative of a position of the closing disc bearing 51 relative to the closing link 39. Still in another example, the sensor signal may be indicative of a position of the segments 45 relative to the frame 24. In certain embodiments, at least one actuator position sensor 59 may be integrated within the actuator 38. For example, the actuator position sensor 59 may be integrated within the actuator 38 and may output a signal indicative of an amount of extension of the actuator, which is indicative of the position of the clevis pin 46 relative to the row unit frame 24.

In the illustrated embodiment, the monitoring system 60 includes a controller 64. The controller 64 may determine an offset ratio based on the calibration length of the actuator 38, the length of the actuator 38 while the closing discs 42 are at the upper vertical limit, and the length of the actuator 38 while the closing discs 42 are at the lower vertical limit. In addition, the controller 64 may compare the offset ratio to a target offset ratio to determine a relative amount of wear on the opener discs 36, the closing discs 42, or both. Furthermore, in certain embodiments, the controller 64 is configured to determine the closing depth of the closing discs 42 beneath the soil surface 26. In such embodiments, the monitoring system 60 may control the actuator 38 to achieve a target closing depth for the closing discs 42, thereby improving seeding operations.

In an embodiment, an operator and/or the monitoring system 60 may set the penetration depth and/or the closing depth. In the illustrated embodiment, the monitoring system 60 includes a user interface 61 configured to receive operator inputs and present visual and/or graphical data to the operator (e.g., including a representation of the penetration depth and/or the closing depth). The user interface 61 is configured to enable the operator to control certain parameter(s) associated with operation of the monitoring system 60. In the illustrated embodiment, the user interface 61 includes an input assembly 62 and a display 63. The input assembly 62 may include one or more buttons, switches, knobs, or a combination thereof, for the operator to input commands and/or instructions, which may be presented on the display 63. For example, the operator may press a button of the input assembly 62 to initiate calibration operations, seeding operations, or a combination thereof. The display 63 is configured to present information to the operator, such as a graphical representation of the vertical offset between the rotation axes of the closing discs 42 and the opener discs 36, the zero offset point, the extension length of the actuator 38, a rate of seeding operations, a type of seed, certain parameter(s) associated with the actuator(s) (e.g., the sensor data), or a combination thereof. In certain embodiments, the display 63 may include a touchscreen interface that enables the operator to control certain parameters (e.g., position of the gauge wheels 32, position of the closing discs 42 relative to the frame 24, etc.) associated with operation of the agricultural implement 10. For example, the operator may use the display 63 to perform the calibration, initiate seeding operations, input one or more parameters for the seeding operations, or a combination thereof.

In the illustrated embodiment, the user interface 61 is communicatively coupled to the controller 64. In addition, in the illustrated embodiment, the controller 64 includes a processor 65, such as a microprocessor, and a memory device 66. The processor 65 may be used to execute software, such as software for controlling the depth control system 35. Moreover, the processor 65 may include multiple microprocessors, one or more "general-purpose" microprocessors, one or more special-purpose microprocessors, and/ or one or more application specific integrated circuits (ASICS), or some combination thereof. For example, the processor 65 may include one or more reduced instruction set (RISC) or complex instruction set (CISC) processors.

The memory device 66 may include a volatile memory, such as random access memory (RAM), and/or a nonvolatile memory, such as read-only memory (ROM). The memory device 66 may store a variety of information and may be used for various purposes. For example, the memory device 66 may store processor-executable instructions (e.g., firmware or software) for the processor 65 to execute, such as instructions for determining the zero offset point, the vertical offset between the rotation axes of the closing discs 42 and the opener discs 36, the calibration length of the actuator 38, the offset ratio, etc. The storage device(s) (e.g., nonvolatile storage) may include ROM, flash memory, a hard drive, or any other suitable optical, magnetic, or solid-state storage medium, or a combination thereof. The storage device(s) may store data (e.g., zero offset point, vertical offset, target offset ratio etc.), instructions (e.g., software or firmware for controlling the monitoring system 60), and any other suitable data. The processor 65 and/or the memory device, and/or additional processor(s) and/or memory device(s), may be located in any suitable portion(s) of the agricultural implement and/or the work vehicle.

In certain embodiments, the user interface 61 is configured to receive one or more inputs, such as calibration inputs (e.g., instructions to initiate calibration, etc.), seeding operation inputs (e.g., target seeding rate, target closing depth, target penetration depth, etc.), operation inputs (e.g., initiate seeding operations, etc.), other suitable inputs, or a combination thereof, and the user interface 61 is configured to output signal(s) indicative of the input(s) to the controller 64. By way of example, to initiate calibration, the operator may input one or more inputs to the user interface 61 regarding the position of the closing discs 42 relative to the row unit frame 24. In another example, the operator may input one or more inputs to the user interface 61 regarding the seeding operation, such as the target penetration depth of the opener discs 36 and/or the target closing depth of the closing discs 42. The controller 64 may receive the signal(s) and control the depth control system 35, thereby controlling the extension length of the actuator 38, which controls the closing depth of the closing discs 42, and/or the position of the gauge wheels 32, which controls the penetration depth of the opener discs 36, during calibration operations and/or seeding operations.

The monitoring system 60 described herein may be installed in both new and existing seeding implements. Installation of the monitoring system 60 includes disposing one or more sensors 59 onto or within the row unit 16 (e.g., onto or within the actuator 38). For example, the one or more sensors 59 may be secured to the actuator 38 via various interface and mounting features, such as fasteners, tab extensions, etc. The controller 64 may determine whether the closing link 39 is against the upper stop or lower stop based on the signal from the actuator position sensor 59.

Figure 3:
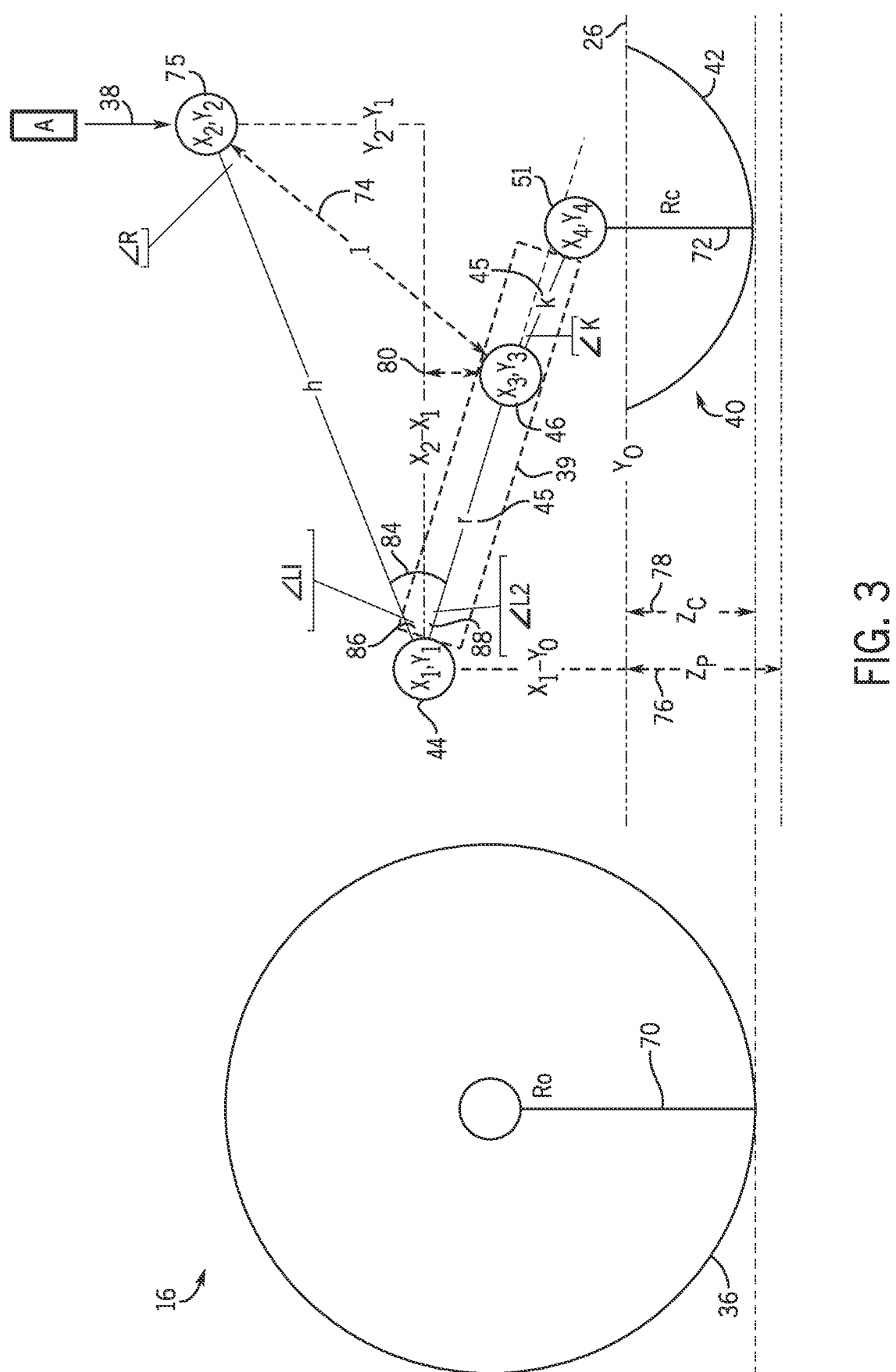
FIG. 3 is a block diagram of the row unit of FIG. 2, showing parameters for determining an actuator extension length and a closing disc penetration depth.

A calibration procedure may be performed to determine the zero offset point, which corresponds to the vertical offset between the rotation axes of the closing discs 42 and the opener discs 36 while the closing discs 42 and the opener discs 36 are in contact with a common plane (e.g., at the ground surface 26). FIG. 3 is a block diagram of the row unit 16 of FIG. 2, showing parameters for determining an actuator extension length and a closing disc penetration depth. As previously discussed, the row unit 16 includes the opener discs 36 and the closing assembly 40, which includes the closing discs 42. A size (e.g., diameter, radius) of the opener discs 36 is larger than a size (e.g., diameter, radius) of the closing discs 42. As illustrated, an opener disc radius (Ro) 70 is greater than a closing disc radius (Rc) 72. The difference between the opener disc radius Ro 70 and the closing disc radius Rc 72 is unknown unless calibration or measurement is performed (e.g., on brand new parts before installation). Before seeding operations, the monitoring system 60 may perform the calibration procedure to determine the zero offset point and monitor wear on the discs. In order for the bottom of the opener discs 36 and the bottom of the closing discs 42 to be on the same plane (e.g., level on a soil or ground surface 26), the actuator 38 may extend/retract a length to move the closing discs 42 in the vertical direction. For example, before initiating the calibration process, the actuator 38 may be fully retracted, and the opener discs 36 may be placed in contact with the ground surface 26. Upon initiating the calibration process, the controller 64 may control the actuator 38 to extend, thereby causing the closing discs 42 to contact the ground surface 26. The extension length 74 of the actuator 38 while the closing discs 42 and the opener discs 36 are in contact with the ground surface is the calibration length ($L_C$). For example, the actuator 38 may extend approximately 0.5 meters (m) to align the bottom of the closing discs 42 with the bottom of the opener discs 36.

To initiate seeding operations, the operator may enter a target penetration depth for the opener discs 36 and/or a target closing depth for the closing discs 42. By determining the calibration length $L_C$ during the calibration process, the monitoring system 60 may determine the closing depth (Zc) 78 of the closing discs 42 during seeding operations. In this way, the monitoring system 60 may control extension of the actuator 38 to substantially achieve the target closing depth (e.g., achieving the target depth within a threshold distance), thereby improving seeding operations.

For example, the gauge wheels may control the opener discs 36 to excavate a trench into the soil at a penetration depth (Zp) 76. The actuator 38 may position the closing discs 42 at a closing depth (Zc) 78 to move displaced soil into the trench. In the illustrated embodiment, the closing depth (Zc) 78 may be slightly shallower compared to the penetration depth (Zp) 76. However, in other embodiments, the closing depth 78 may be the same or nearly the same depth as the penetration depth 76. To position the closing discs 42, the actuator 38 may extend to a length (e.g., extension length 74), thereby urging the closing discs 42 into the soil. The actuator 38 includes an actuator pin 75 that couples the actuator 38 to the row unit frame 24. A position of the actuator pin 75 may not substantially change before, during, or after seeding operations, as such the position of the clevis pin 46 relative to the frame 24 may be determined. The extension length 74 is measured by the actuator position sensor, and the actuator position sensor outputs a sensor signal indicative of the extension length to the controller. The extension length 74 may be used by the controller to determine a vertical position of the clevis pin 46 relative to the linkage pin 44 and/or a vertical position of the closing disc bearing 51 relative to the linkage pin 44. In certain embodiments, when the bottom of the opener discs 36 and the closing discs 42 are even, the controller is configured to determine a position of the clevis pin 46 relative to the row unit frame 24 using feedback from the actuator position sensor signal and one or more equations. Additionally or alternatively, the extension length 74 may be measured from the position of the clevis pin relative to the row unit frame, and a relative depth change (e.g., closing depth) of the closing discs 42 with respect to the row unit frame may be determined by the controller based on a vertical offset of the clevis pin 46.

To determine the vertical position of the rotation axis of the closing discs 42/closing disc bearing 51 relative to the row unit frame 24, the controller may use one or more equations. In the illustrated embodiment, the opener discs 36 may be at the penetration depth 76, and the closing discs 42 may be at the closing depth 78. The soil surface 26 may be at relative coordinates ($y_0$), the linkage pin 44 may be at relative coordinates ($x_1$, $y_1$), the actuator pin 75 may be at relative coordinates ($x_2$, $y_2$), the clevis pin 46 may be at relative coordinates ($x_3$, $y_3$), and the closing disc bearing 51 may be at relative coordinates ($x_4$, $y_4$). In certain embodiments, the penetration depth (Zp) 76 of the opener disc 36 may be unknown, and the closing depth (Zc) 78 of the closing discs 42 may be determined (e.g., relative to the penetration depth 76). Furthermore, in certain embodiments, the depth control system 37 may control the gauge wheels 32 to establish a target penetration depth, and the controller may determine the closing depth 78 based on the penetration depth 76.

First, a hypotenuse length (h) 82 between the linkage pin 44 and the actuator pin 75 may be calculated:

$$h = \sqrt{(y_2 - y_1)^2 + (x_2 - x_1)^2} \qquad (1)$$

The hypotenuse length (h) 82 may use the coordinates of the linkage pin ($x_1$, $y_1$) 44 and the coordinates of the actuator pin ($x_2$, $y_2$) 75. Next, an angle ($\angle L1 + \angle L2$) 84 between the actuator pin 75, the linkage pin 44, and the clevis pin 46 may be calculated:

$$\angle L1 + \angle L2 = \text{ACOS} \frac{h^2 + r^2 + l^2}{2 \times h \times r} \qquad (2)$$

The angle ($\angle L1 + \angle L2$) 84 may calculated with the hypotenuse length (h) 82, a radius (r) of the closing link 39 measured from the linkage pin 44 to the clevis pin 46 (e.g., the length of a first segment 45 of the closing link 39, and the extension length (l) 74. As such, an angle ($\angle L1$) 86 between the actuator pin 75 and the linkage pin 44 may be calculated:

$$\angle L1 = \text{ATAN} \frac{(y_2 - y_1)}{(x_2 - x_1)} \qquad (3)$$

The angle ($\angle L1$) 86 may be calculated with the coordinates of the linkage pin 44 ($x_1$, $y_1$) and the coordinates of the actuator pin 75 ($x_2$, $y_2$). In this way, an angle ($\angle L2$) 88 between the linkage pin 44 and the clevis pin 46 may be calculated. The angles L1 and $\angle L2$ are determined relative to a horizontal axis parallel to the ground surface. With the angle ($\angle L2$) 88, a vertical offset ($\Delta y$) 80 of the clevis pin 46 may be calculated:

$$\Delta y = r \times \text{SIN}(\angle L2) \qquad (4)$$

The vertical offset ($\Delta y$) 80 of the clevis pin 46 may be determined by the radius (r) of the closing link 39 measured from the linkage pin 44 to the clevis pin 46, and the angle ($\angle L2$) 88 between the linkage pin 44 and the clevis pin 46. Knowing the vertical offset ($\Delta y$) 80 of the clevis pin 46, the closing depth 78 of the closing discs 42 may be determined:

$$z_c = \Delta y + (y_1 - y_0) + Rc \times \text{SIN}(\angle L2 + \angle K) \qquad (5)$$

The closing depth ($z_c$) may be determined by the vertical offset ($\Delta y$) of the clevis pin 46 during seeding operations, the height of the row unit frame ($y_1 - y_0$) 24, the radius of the closing discs 42 (Rc), the length (k) of the second segment 45 of the closing link 39, and the angle of the second segment 45. As such, the closing depth 78 of the closing discs 42 relative to the row unit frame 24 during seeding operations may be determined. The determination described above may be applied to all or some row units 16 of the agricultural implement 10.

The geometry described with respect to FIG. 3 is merely exemplary. In other embodiments, the geometry of the row unit 16 may be different. For example, the actuator 38 may be a rotary actuator and the offset ratio may be determined based on angles rather than extension length. In another example, the row unit 16 may include one closing disc 42 rather than two, as such the equations may be adapted to the single closing disc. Additionally or alternatively, the closing disc radius (Rc) may be determined during the calibration process. In certain instances, the closing disc radius (Rc) may be provided by a manufacturer and/or measured prior to installation on the row unit 16. As such, different equations may be used to determine the vertical offset 80 of the clevis pin 46, the closing depth 78, or the like.

Figure 4:
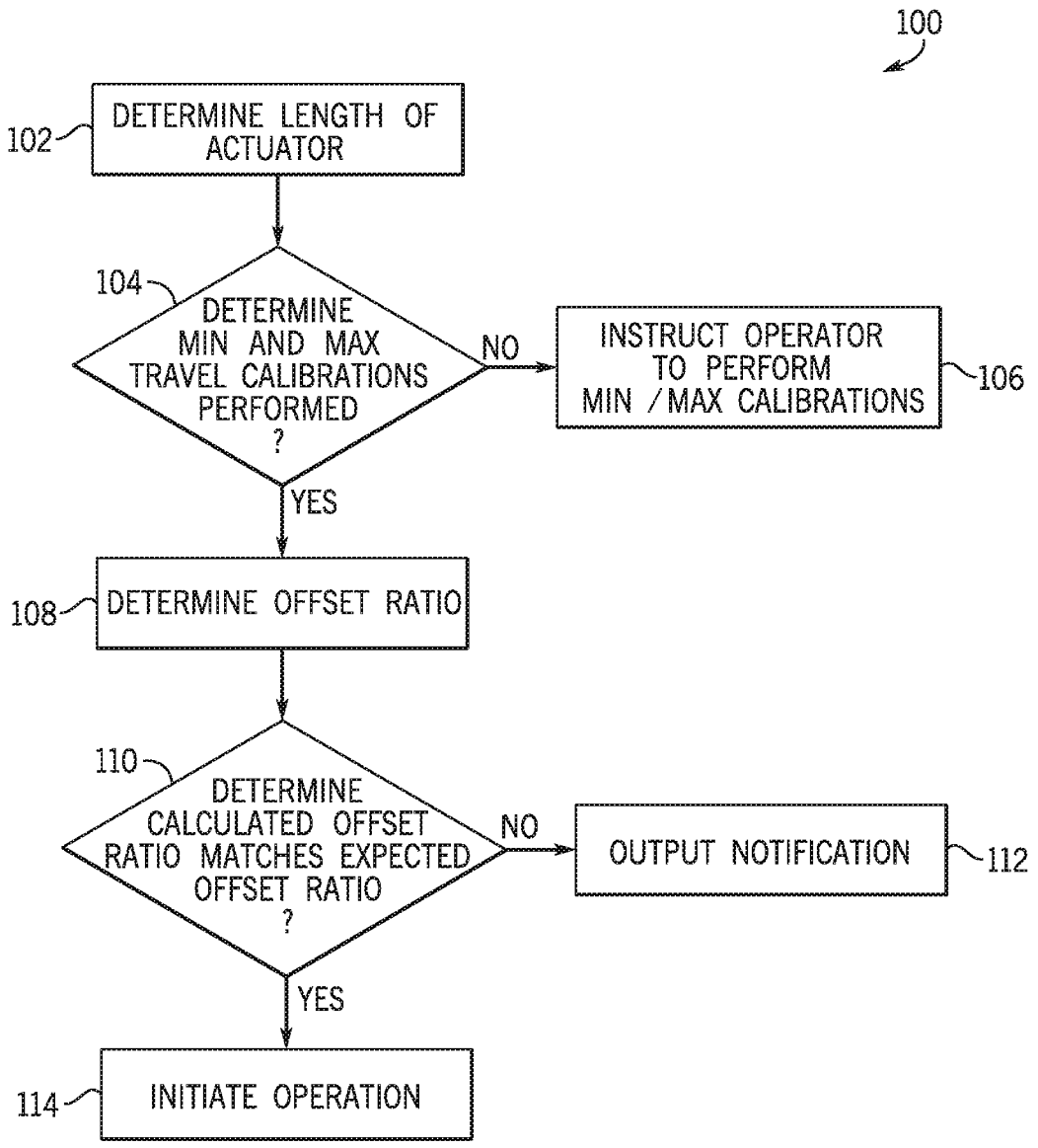
FIG. 4 is a flow diagram of an embodiment of a method for performing a calibration and outputting a notification and/or initiating seeding operations.

FIG. 4 is a flow diagram of an embodiment of a method 100 for performing a calibration and outputting a notification and/or initiating seeding operations. The monitoring system controller may determine (e.g., based on feedback from the actuator position sensor(s)) the extension length of the closing position actuator while the closing link is stopped at the upper stop and the lower stop (e.g., while the closing discs are positioned at the upper vertical limit and the lower vertical limit), and the controller may determine the offset ratio based on the upper and lower extension lengths and the calibration length. Based on the measured offset ratio, the monitoring system controller may determine excessive wear on the closing discs, the opener discs, or both.

At block 102, the controller may determine an extension length of the closing position actuator. For example, the controller may determine the calibration length ($L_C$) of the closing position actuator when the row unit is resting on a hard, level surface. The bottom of the opener discs and the closing discs may be on the same plane (e.g., ground surface), and the extension length of the closing position actuator may be measured by the actuator position sensor. The calibration length $L_C$ is also the zero offset actuator extension length. From the zero offset actuator extension length, extension of the actuator moves the closing discs downwardly and retraction of the actuator moves the closing discs upwardly.

At block 104, the controller may determine whether a minimum and maximum travel calibration over the calibration range has been performed. As previously discussed, the monitoring system controller may control the closing position actuator to drive the closing link to move between the upper stop and the lower stop (e.g., between the upper vertical limit and the lower vertical limit of the closing discs). The closing link may start at the lower stop and end at the upper stop, or the closing link may start at the upper stop and end at the lower stop. Further, the monitoring system controller may determine the extension length of the actuator ($L_{CB}$) while the closing link is at the lower stop and the length of extension of the actuator ($L_{CT}$) while the closing link is at the upper stop.

In certain embodiments, the actuator may cause the closing linkage to travel beyond the upper stop or lower stop, thereby indicating that a component of the row unit 16 may not be functioning effectively. For example, the upper stop may be deformed or missing, thereby enabling the closing link to travel beyond the upper stop in the vertical direction. In another example, the lower stop may be deformed or missing, thereby enabling the closing links 39 to travel beyond the lower stop in the vertical direction. Accordingly, the extension length of the actuator may be greater than a maximum extension length and/or less than a minimum extension length, which may be indicative of a deformed or missing component. The monitoring system controller may output a notification to the user interface indicating that a part or component of the row unit is not functioning effectively in response to determining that the extension length of the actuator is greater than the maximum extension length and/or less than the minimum extension length.

If the calibration has not been performed, then at block 106 the controller may instruct the operator to perform the minimum and maximum calibration. For example, the controller may output a signal to the user interface (e.g., the display of the user interface) indicating the minimum and maximum calibration has not been completed. In response, the user interface may present an indication that the minimum and maximum calibration has not been completed. Additionally or alternatively, the system may not perform seeding operations until the calibration has been completed.

If the minimum and maximum calibration has been completed, then at block 108 the controller may determine the offset ratio. For example, the controller may determine the calibration length ($L_C$) of the actuator when the row unit is resting on a hard, level surface. The controller may then cause the actuator extend to move the closing discs downwardly and retract to move the closing discs upwardly. The controller may determine the offset ratio and compare the determined offset ratio with the target offset ratio (e.g., stored in the memory of the controller).

At block 110, the controller may determine whether the determined offset ratio matches (e.g., is within a threshold range of) the target offset ratio. The target offset ratio may be calculated by determining the difference between the calibration length ($L_C$) and the extension length when the closing linkage is at the upper stop ($L_{CT}$) over the difference between the extension length when the closing linkage is at the bottom stop ($L_{CB}$) and the calibration length ($L_C$).

$$\text{Offset Ratio} = \frac{L_C - L_{CT}}{L_{CB} - L_C} \qquad (6)$$

The controller may perform the measurements when the opener disc and the closing discs are new (e.g., no wear). For example, $L_{CT}$ is the approximately a smallest length of extension the actuator and $L_{CB}$ is the largest extension length the actuator. As such, the target offset ratio represents a target state of the discs.

The controller may compare the offset ratio determined at block 108 to the target offset ratio. If the determined offset ratio does not match or does not substantially match (e.g., is not within a threshold range of) the target offset ratio, at block 112 the controller may output a signal indicative of a notification. For example, the controller may output a signal to the user interface (e.g., the display of the user interface) indicative of excessive disc wear. The user interface (e.g., the display of the user interface), in turn, may notify the operator that the opener discs or the closing discs have excessive wear, or that the wear on the opener discs or the closing discs are greater than a threshold. In addition, in certain embodiments, the controller may instruct the display to present a graphical representation of the vertical offset of the rotation axes of the closing discs and the opener discs, the zero offset point, the determined offset ratio, the target offset ratio, the position of the clevis pin relative to the frame, or a combination thereof.

For example, if the determined offset ratio is greater than the target offset ratio (e.g., by more than a threshold value), then the controller may determine that the closing discs have excessive wear. The controller may then output a signal to the user interface indicative of excess closing disc wear. In another example, if the determined offset ratio is less than the target offset ratio (e.g., by more than a threshold value), then the controller may determine that the opener discs have excessive wear. The controller may then output a signal to the user interface indicative of excess opener disc wear.

However, if the determined offset ratio matches (e.g., is within a threshold range of) the target offset ratio, the controller may output a signal indicative of a notification. For example, the controller may output a signal to the user interface (e.g., the display of the user interface) indicative of completion of the calibration process/no excessive wear detected. The user interface (e.g., the display of the user interface), in turn, may notify the operator that the calibration process is complete/no excessive wear is detected. In addition, in certain embodiments, the controller may instruct the display to present a graphical representation of the vertical offset of the rotation axes of the closing discs and the opener discs, the determined offset ratio, the target offset ratio, the position of the clevis pin relative to the frame, the zero offset point, or a combination thereof. Still, in another example, the user interface may prompt the operator to initiate seeding operations and/or enter one or more inputs related to seeding operations.

After successful completion of the calibration process, seeding operations may be initiated (e.g., automatically or in response to operator input to the user interface), as shown in block 114, or the operator may instruct the controller to block or stop operations. The controller may determine the closing depth using the geometry described with respect to FIG. 3. The controller may control the closing depth to match or substantially match a target closing depth. The operator may initiate the seeding operation by inputting instructions on the input assembly of the user interface by depressing a button, turning a knob, or a combination thereof. Additionally or alternatively, the operator may end seeding operations by inputting instructions on the input assembly. The method described above may be stored on one or more tangible, non-transitory, machine-readable media and/or may be performed by the processor of the controller described above with reference to FIG. 2 and/or on other suitable controller(s). The steps of the method 100 may be performed in the order disclosed above or in any other suitable order. Furthermore, certain steps of the method may be omitted.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
an actuator configured to couple to a closing link and to a frame of an agricultural row unit, wherein the closing link is configured to pivotally couple to the frame, and the actuator is configured to drive the closing link to rotate relative to the frame to control a closing depth of a closing disc rotatably coupled to the closing link;
a monitoring system comprising a sensor configured to output a sensor signal indicative of an extension length of the actuator; and
a controller comprising a memory and a processor, wherein the controller is communicatively coupled to the sensor, and the controller is configured to:
determine the extension length of the actuator at a minimum extension length, a maximum extension length, and a calibration extension length based on the sensor signal;
determine an offset ratio based on the minimum extension length, the maximum extension length, and the calibration extension length;
compare the offset ratio to a target offset ratio; and
output a control signal to initiate operation in response to the offset ratio matching the target offset ratio.

2. The system of claim 1, wherein the controller is configured to determine the calibration extension length of the actuator based on the sensor signal while the closing disc and an opener disc of the agricultural row unit are in contact with a common plane.

3. The system of claim 1, wherein the controller is configured to determine the minimum extension length of the actuator based on the sensor signal while the closing disc is at an upper vertical limit, and the controller is configured to determine the maximum extension length of the actuator based on the sensor signal while the closing disc is at a lower vertical limit.

4. The system of claim 1, comprising an upper vertical limit and a lower vertical limit, wherein the controller is configured to:
determine a target minimum extension length of the actuator based on the sensor signal when the closing disc is at the upper vertical limit and when the closing disc is new; and
determine a target maximum extension length of the actuator based on the sensor signal when the closing disc is at the lower vertical limit and when the closing disc is new.

5. The system of claim 1, wherein the controller is configured to:

output a first information signal indicative of excessive closing disc wear in response to determining the offset ratio is greater than the target offset ratio by more than a first threshold value; and
output a second information signal indicative of excessive opener disc wear in response to determining the offset ratio is less than the target offset ratio by more than a second threshold value.

6. The system of claim 1, wherein the controller is configured to determine the closing depth based on a vertical offset of the closing link relative to the frame, a length of the closing link, and an angle between the closing link and the frame.

7. The system of claim 6, wherein the controller is communicatively coupled to the actuator, and the controller is configured to control the extension length of the actuator based on the closing depth.

8. A method for determining wear on an opener disc and a closing disc, the method comprising:
determining, via a controller, a calibration extension length of an actuator based on a sensor signal while the closing disc and the opener disc are in contact with a common plane;
determining, via the controller, an offset ratio based on the calibration extension length, a minimum extension length, and a maximum extension length; and
output, via the controller, a control signal to initiate operation in response to the offset ratio matching a target offset ratio.

9. The method of claim 8, comprising determining, via the controller, the minimum extension length of the actuator based on the sensor signal while the closing disc is at an upper vertical limit.

10. The method of claim 8, comprising determining, via the controller, the maximum extension length of the actuator based on the sensor signal while the closing disc is at a lower vertical limit.

11. The method of claim 8, comprising determining, via the controller, the target offset ratio by:
determining a target minimum extension length of the actuator based on the sensor signal while the closing disc is at a upper vertical limit, wherein the closing disc and the opener disc are new;
determining a target maximum extension length of the actuator based on the sensor signal while the closing disc is at a lower vertical limit, wherein the closing disc and the opener disc are new; and
determining the target offset ratio based on the calibration extension length, the target minimum extension length, and the target maximum extension length.

12. The method of claim 11, comprising:
comparing, via the controller, the offset ratio to the target offset ratio; and
outputting, via the controller, a first signal indicative of excessive wear on the closing disc in response to determining the offset ratio is greater than the target offset ratio by more than a threshold value; or
outputting, via the controller, a second signal indicative of excessive wear on the opener disc in response to determining the offset ratio is smaller than the target offset ratio by more than the threshold value.

13. The method of claim 8, comprising:
determining, via the controller, the maximum extension length and the minimum extension length have not been measured; and
outputting, via the controller, a notification to perform the measurements.

14. A non-transitory computer readable medium for detecting excessive wear on an opener disc, a closing disc, or both, the non-transitory computer readable medium comprising:

receiving a first sensor signal indicative of an actuator extension length of an actuator at a minimum vertical offset, a maximum vertical offset, and a calibration extension length;

determining an offset ratio based on the minimum vertical offset, the maximum vertical offset, and the calibration extension length;

comparing the offset ratio to a target offset ratio; and outputting a control signal to initiate operation in response to the offset ratio matching the target offset ratio.

15. The non-transitory computer readable medium of claim 14, comprising determining the calibration extension length based on the first sensor signal while the closing disc and the opener disc are in contact with a common plane.

16. The non-transitory computer readable medium of claim 14, comprising outputting a first signal indicative of excessive wear on the closing disc in response to determining the offset ratio is greater than the target offset ratio by more than a threshold value.

17. The non-transitory computer readable medium of claim 14, comprising outputting a second signal indicative of excessive wear on the opener disc in response to determining the offset ratio is smaller than the target offset ratio by more than a threshold value.

18. The non-transitory computer readable medium of claim 14, comprising:

determining a closing depth of the closing disc by:

determining a hypotenuse length between the actuator and a linkage pin based on the first sensor signal;

calculating a first angle between the actuator, the linkage pin, and a clevis pin coupled to the closing disc based on the hypotenuse length;

calculating a second angle between the actuator and the linkage pin based on the first angle;

calculating a vertical offset of the clevis pin based on the second angle; and calculating the closing depth based on the vertical offset of the clevis pin, a radius of the closing disc, and a difference between the first angle and the second angle.

19. The non-transitory computer readable medium of claim 18, comprising:

determining the actuator extension length associated with the closing depth; and outputting a second control signal indicative of the actuator extension length.

20. The non-transitory computer readable medium of claim 14, comprising:

determining the maximum vertical offset and the minimum vertical offset have not been received; and outputting a notification to perform the measurements.

\* \* \* \* \*